United States Patent
Horowitz et al.

[11] 3,862,782
[45] Jan. 28, 1975

[54] SPRING BRAKE CHAMBER CONTROL VALVE

[75] Inventors: Charles F. Horowitz, Niles; Boleslaw Klimek, Des Plaines, both of Ill.

[73] Assignee: The Berg Manufacturing Company, Des Plaines, Ill.

[22] Filed: Feb. 22, 1974

[21] Appl. No.: 444,820

Related U.S. Application Data

[63] Continuation-in-part of Ser. No. 383,384, July 27, 1973, abandoned.

[52] U.S. Cl. ............ 303/40, 303/30, 303/64
[51] Int. Cl. .............................. B60t 15/02
[58] Field of Search ........... 303/40, 29, 13, 9, 7, 28, 303/65, 80, 30, 85, 64, 71, 78; 188/170

[56] References Cited
UNITED STATES PATENTS

| | | |
|---|---|---|
| 3,059,975 | 10/1962 | Morse .................................. 303/40 |
| 3,097,021 | 7/1963 | Dobrikin ............................. 303/40 |
| 3,273,582 | 9/1966 | Valentine ............................ 303/85 |
| 3,285,672 | 11/1966 | Aurea ................................. 303/9 |
| 3,304,131 | 2/1967 | Bueler ................................ 303/29 |
| 3,411,836 | 11/1968 | Dobrikin et al. ................... 303/40 |
| 3,456,991 | 7/1969 | Valentine et al. .................. 303/40 |

*Primary Examiner*—Trygve M. Blix
*Assistant Examiner*—D. C. Butler

[57] ABSTRACT

A control valve for use in a vehicle air brake system to apply brake releasing pressure to spring-actuated brakes. The valve includes a protection valve for the vehicle service tank, as well as a check valve for protecting the vehicle emergency tank. In addition, the valve includes a piston and shuttle for controlling the passage between the vehicle emergency tank and the spring brake chambers and a check valve for bleeding trapped pressure from the service line.

20 Claims, 6 Drawing Figures

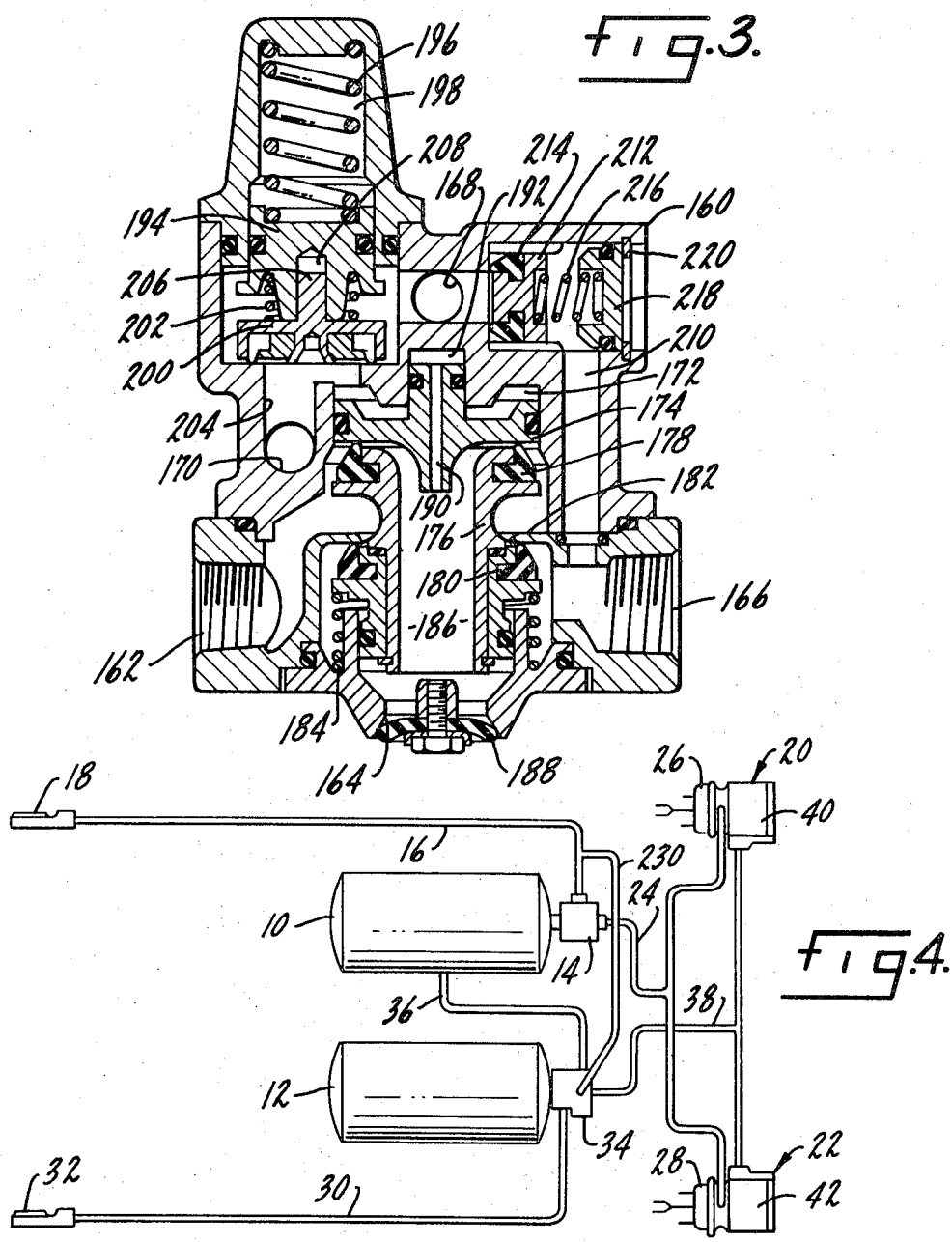

SPRING BRAKE CHAMBER CONTROL VALVE

This application is a continuation-in-part of my co-pending application Ser. No. 383,384, filed July 27, 1973 now abandoned.

SUMMARY OF THE INVENTION

The present invention relates to vehicle air brake systems and in particular to a control valve providing a connection between the vehicle service tank, emergency tank and spring brake chambers.

A primary purpose of the present invention is a valve of the type described which accomplishes the function of a number of previously-used separate valves in a vehicle air brake system.

Another purpose is a simply constructed reliably operable control valve for use between the service tank, emergency tank and spring brake chambers of a vehicle air brake system.

Another purpose is an improved valve structure for controlling the supply of pressure to the service tank, emergency tank and spring brake chambers.

Another purpose is a valve structure of the type described including a check valve adapted to be connected to the service line for bleeding trapped pressure from the service line through the valve structure.

Other purposes will appear in the ensuing specification, drawings and claims.

BRIEF DESCRIPTION OF THE DRAWINGS

The invention is illustrated diagrammatically in the following drawings wherein:

FIG. 3 is a vertical section, similar to FIG. 1, showing a further form of valve structure, FIG. 4 is a diagrammatic illustration of a modified vehicle air brake system.

DESCRIPTION OF THE PREFERRED EMBODIMENT

Figure 1:
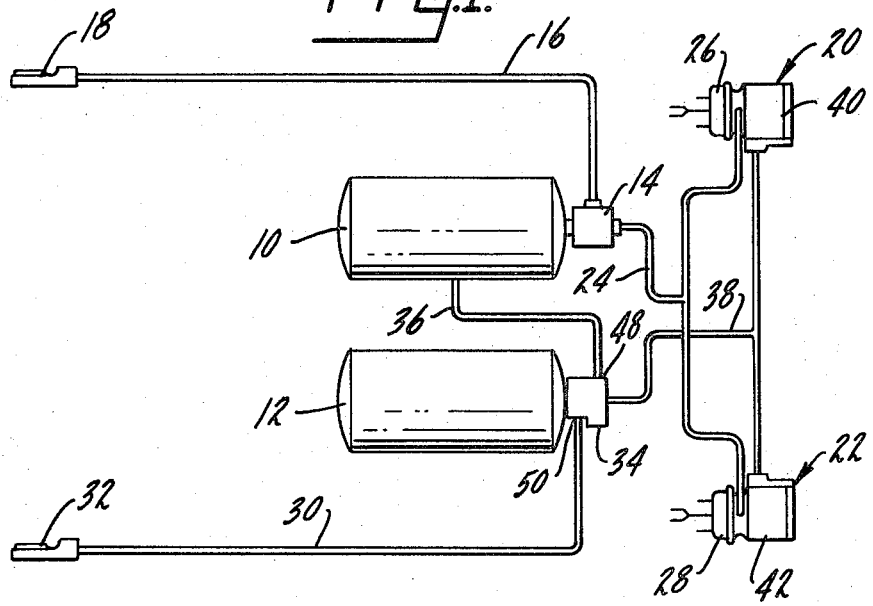
FIG. 1 is a diagrammatic illustration of a portion of a vehicle air brake system.

FIG. 1 shows a portion of a vehicle air brake system with the service tank being indicated at 10 and the emergency tank being indicated at 12. A relay valve 14 connects a tractor service line 16 to a gladhand connector illustrated at 18. Conventional spring brake actuators are indicated at 20 and 22. A conduit 24 connects the relay valve 14 to the service portions 26 and 38 of the spring brake actuators 20 and 22. A conduit 30 connects tractor supply gladhand 32 to a valve 34, described hereinafter. Valve 34 is connected by a conduit 36 to the service tank 10 and is connected directly to the emergency tank 12. A conduit 38 connects valve 34 to the emergency portions 40 and 42 of the spring brake actuators 20 and 22.

In a typical operation, when the brakes are to be applied under normal circumstances, an air pressure signal from gladhand 18 will flow through conduit 16 and will cause relay valve 14 to apply pressure to the service portions 26 and 28 of the spring brake actuators.

Spring brake actuators of the type illustrated at 20 and 22 have emergency brake portions which are spring-operated and air pressure-released. Thus, to operate the emergency portions 40 and 42, air pressure to the spring brake actuator is cut off and the springs apply the emergency brakes. To release the brakes, air pressure must be supplied to compress the springs. In this case, an air pressure signal through conduit 30 will cause valve 34 to open communication from the emergency tank 12, through conduit 38, and thus supply pressure to the emergency portions 40 and 42 of the spring brake actuators to release the brakes. The emergency brakes are only released when there is sufficient pressure in the vehicle air brake system.

Figure 2:
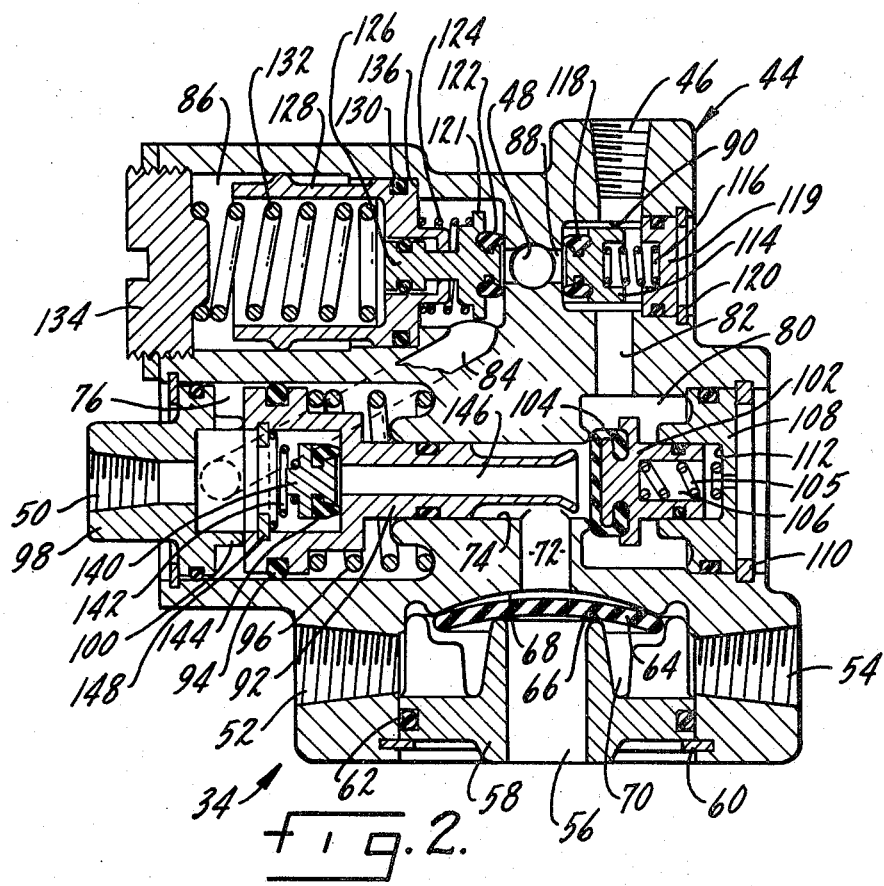
FIG. 2 is a vertical section through a valve structure of the type disclosed herein.

The valve 34 is detailed in FIG. 2. A housing is indicated generally at 44 and includes an emergency tank port 46 and a service tank port 48. The inlet for the valve 34 is indicated at 50 and, as described above, will be connected to the conduit 30. Outlets for the spring brake chamber are indicated at 52 and 54 and these outlets may typically be directly connected to the spring brakes or there may be a single outlet with conduit 38 branching between the emergency portions 40 and 42 of the spring brake actuators. The ports for housing 44 are completed by an exhaust port 56.

A member 58 defines the exhaust port 56 and is fixed in position within housing 44 by a snap ring or the like 60. An O-ring seal 62 forms a seal between member 58 and the housing 44. The internal end of exhaust port 56 may be controlled by a diaphragm 64, which may either close upon the internal lip 66 of member 58, or fit upwardly against dome-shaped surface 68 of the housing. In the position shown, diaphragm 64 is closed upon lip 66. Member 58 may have an annular chamber 70 surrounding passage 56 so that when the diaphragm is closed upon annular lip 66, the ends of the diaphragm may move into the chamber to open communication between spring brake ports 52 and 54 and a passage 72 positioned above the diaphragm.

A central passage 74, having an enlarged portion 76, connects inlet 50 and a chamber 80. A passage 82 connects chamber 80 and emergency tank port 46. A diagonal passage 84 connects inlet 50 and a chamber 86, with chamber 86 opening into a passage 88 connecting service tank port 48 and a chamber 90 connected in turn to passage 82 and port 46.

A piston 92 is positioned within passage portion 76 and has an O-ring seal 94 which seals the outside of the piston with the internal surface of passage portion 76. A coil spring 96 positioned within passage portion 76 normally biases piston 92 to the left, as shown in FIG. 2. A port member 98, which is used to form the inlet port connection 50, defines a stop 100 which limits the left-hand travel of piston 92.

Positioned within chamber 80 is a shuttle 102 having a seal member 104 which seals against the entrance to passage 74, as shown in FIG. 2. A coil spring 105, positioned within a chamber 106 of shuttle 102, normally biases the shuttle toward the closed position of FIG. 2. A retainer 108, held in position by a ring 110, has a chamber 112 which bottoms coil spring 105 and receives an extending portion of the piston 102 and thus defines the path of piston 102 within chamber 80.

Positioned within chamber 90 is a check valve consisting of a piston 114 urged to the closed position of FIG. 2 by a coil spring 116. A seal element 118 normally seals the entrance of passage 88 into chamber 90. A retainer 119 held in place by a ring 120 provides a seat for coil spring 116 and limits movement of piston 114.

A pressure protection valve for the service tank port 48 is positioned within chamber 86 and includes a first piston 121, carrying a seal member 122 and urged to the closing position of FIG. 2 by a coil spring 124. The first piston 121 has a portion 126 which extends within a second piston 128. Coil spring 124 is bottomed upon a shoulder of second piston 128 and normally urges the first piston to the closed position shown in the drawings. The second piston 128, carrying an external seal ring 130, is biased to the right by a coil spring 132 which extends within the piston and is bottomed upon a retainer 134. Spring 132 urges the piston 128 to the right until it strikes a shoulder 136 in the housing 44.

Within the piston 92 is a check valve made up of a movable valve member 140, spring-biased by a spring 142, to have a seal 144 close the central passage 146 within the piston 92. The spring 142 may be bottomed upon a ring 148.

When the spring brakes are operated, ports 52 and 54 will be connected to the exhaust port 56 and diaphragm 64 will be up against the domed surface 68. When it is desired to release the brakes, an air signaL will be supplied through line 30 to the valve 34. When pressure is supplied at inlet 50, and assuming that the inlet pressure is above a first predetermined minimum level sufficient to compress spring 96, for example from 20 to 45 psi, pressure supplied at the inlet will cause piston 92 to move to the right, thus moving the shuttle 102 to the right and forming a connection between the emergency tank port 46, through chamber 90, passage 82, chamber 80, passage 72, to the diaphragm. The pressure from the emergency tank will cause the diaphragm to seat against lip 66 and the outside surface of the diaphragm will be forced down into the chember 70. Thus, the emergency tank is connected to the spring brake ports 52 and 54 to cause release of the brakes.

If the air pressure applied at the inlet 50 is above a second predetermined level, for example 55 psi, the pressure through passage 84 will be sufficient to overcome spring 132 and move piston 128 to the left a slight amount, until first piston portion 126 contacts piston 128. Continued movement of piston 128 unseats piston 121 and thus air pressure can then act against the entire cross sectional area of the combined pistons. Both the first and second pistons will move to the left, thus completely opening communication between passage 84 and passage 88 which connects to service tank port 48. Thus, when the pressure supplied at the inlet 50 is above a predetermined point, not only will the brakes be released, but pressure will be supplied to the service tank 10. At the same time, the pressure within passage 88 will cause the check valve consisting of piston 114 to move to the right, thus opening communication between the inlet 50 and the emergency tank port 46. In this instance, air will be supplied to both the service tank and the emergency tank, assuming that pressure at the inlet is above a predetermined point.

Shuttle 102 functions to maintain communication between the emergency tank and the emergency portions of the spring brake chambers as long as pressure in the emergency line is above a lower predetermined point. Thus, the emergency brakes are maintained in an off condition as long as there is a predetermined amount of air pressure in the system.

When the shuttle 102 is moved to the closed position of FIG. 2, thus closing communication between the emergency tank and the spring brake chambers to apply the brakes, the exhaust of pressure from the spring brake chambers through ports 52 and 54 will cause diaphragm 64 to move upwardly against the domed surface 68, thus connecting exhaust port 56 and the spring brake ports 52 and 54. Any air trapped within passage 72 and the central passage 146 of the piston 92 will cause check valve 140 to open, thus exhausting back into the air system.

Valve 34 provides a number of functions. It controls the supply of pressure to the spring brakes to control the application and release of the spring brakes. It can function to supply pressure to the service tank and to the emergency tank when the inlet pressure is above a predetermined point, for example 55 psi. Valve 34 also protects pressure in line 30 when line pressure is less than 55 psi, so as to maintain sufficient pressure to release the spring brakes. Thus, there is a check valve to isolate the emergency tank and a pressure protection valve to protect signal pressure in the supply line to release the spring brakes in case of failure in the service system. There is a shuttle to control pressure to the spring brakes and a quick release valve for faster application of the spring brakes.

FIG. 3 shows a modification of the control valve which performs essentially the same functions as the valve 34 in FIG. 2. A housing 160 has a spring brake chamber port 162, an exhaust port 164, an emergency tank port 166, and a service tank port 168. Line 30 of FIG. 1 may be connected to inlet port 170. Thus, the same connection into the vehicle air brake system, as shown in FIG. 1 and as particularly applied to FIG. 2, is applicable to the structure of FIG. 3.

Positioned within a chamber 172 is a piston 174, the upper side of which is in communication with inlet port 170. A shuttle 176 carries a seal 178 at its upper end which is in contact with the lower surface of piston 174. Shuttle 176 further carries a second seal 180 which is in contact with the lower surface of an inwardly-extending annular lip 182, the space above which is in communication with spring brake chamber port 162. The area beneath annular lip 182 is in communication with emergency tank port 166. A coil return spring 184 which encircles the shuttle 176 and is bottomed upon the housing, urges the shuttle 176 to the position of FIG. 3 in which both seals 180 and 178 perform sealing functions with their respective mating surfaces.

Within shuttle 176 there is a passage 186 which is in communication with the exhaust port 164 through a conventional flapper valve 188. A small passage 190 may connect the exhaust passage 186 with a space 192 above piston 174 so as to permit the piston to be freely movable within chamber 172.

A piston 194 controlled by a spring 196 is positioned within a chamber 198. At the lower end of piston 194 is a shuttle 200 controlled by a spring 202 and movable to control communication between passage 204, connected to port 170, and port 168. Thus, the shuttle 200 and piston 94 control communication between port 170 connected to line 30, and port 168 which is connected to the service tank 10. The shuttle 200 has an upwardly-projecting portion 206 which moves within a similarly-formed chamber 208 in the piston 194.

A passage 210 connects the emergency tank port 166 and a check valve assembly positioned between that passage and the service tank port 168. The check valve, which may be similar to the check valve shown in FIG. 2, includes a piston 212 carrying a seal 214 at one end to close communication betwen port 168 and passage 210. The piston 212 is controlled by a spring 216 which is bottomed upon a retainer 218 in turn held in place by a snap ring or the like 220. Thus, air pressure available at the service tank port 168 can be effective to move the check valve piston 212 and its seal ring away from the sealing position of FIG. 3 to open communication between line 30 and passage 210 which connects to the emergency tank port 166.

In operation, when pressure in line 30 is above approximately 55 psi, or the particular predetermined pressure usable in a specific application, the supply of such pressure against shuttle 200 and piston 194 will cause the shuttle and piston to move upwardly, against the force of spring 196, to open communication between port 170 and the service tank port 168. Similarly, as described in connection with the valve of FIG. 2, such pressure will open communication, through the check valve piston 212, with emergency tank port 166. Once piston 194 has moved upwardly and opened communication as described above, shuttle 200 will function as a check valve. As long as the pressure at port 170 is above a predetermined point, for example 55 psi, the shuttle will remain open and pressure will be supplied both to the service tank and to the emergency tank. However, in the event pressure in the line drops below 55 psi, shuttle 200 will close so that there will be no bleedoff of pressure from the service or emergency tanks. Thus, the shuttle functions as a check valve protecting the pressure in the service and emergency tanks, but permitting these tanks to receive additional pressure when line pressure is above 55 psi.

In the form of the invention shown in FIG. 2, piston 92 moved, in response to pressure at port 50, against spring 96. In the valve of FIG. 3, piston 174 is pressure-balanced. Air pressure from port 170 acts against the upper surface of piston 174. The lower surface of piston 174, outside of seal ring 178, is approximately one-half the area of the pressure area at the top. Thus, for a given pressure from port 170, the pressure beneath piston 174, required to balance the piston, is double that available at port 170. This particular ratio may be varied, but it has been found to be satisfactory in particular applications. In any event, the application of pressure from port 170 moves piston 174 downwardly and thus moves shuttle 176 in a downwardly direction, opening communication between the emergency tank port 166 and the spring brake chamber port 162. The pressure available at port 162, as described above, will be twice that supplied from port 170. Thus, piston 174 modulates the pressure supplied from the emergency tank to the spring brake chamber and modulates it in accordance with the area ratio described above. The pressure supplied from the emergency tank will not be a fixed value, but will vary in accordance with the pressure in line 30 and available at port 170 which determines the distance seal 180 moves from lip 182. Variations in line pressure will affect the pressure applied to the spring brake chamber with the effect that even a small pressure in line 30 can effect some brake release pressure from the emergency tank to the spring brake chambers. In the valve of FIG. 2, there will be no application of brake release pressure unless the pressure in line 30 is above a predetermined point. In the valve of FIG. 3 there can always be some application of brake release pressure as long as there is pressure in line 30.

The only difference between the air system of FIG. 1 and the air system of FIG. 4 is line 230, which connects tractor service line 16 and the valve 34. At times, after a normal application of brakes by a signal through the service line 16, there can be instances in which the supply conduit 30 can have its pressure suddenly reduced which would also cause the brakes to be operated by the emergency springs. Thus, there would be a double application of the brakes which would trap air pressure within service line 16 between relay valve 14 and the tractor protection valve on the tractor. The purpose of line 230 is to bleed off the pressure trapped within service line 16 and for this purpose there is a check valve, described hereinafter, added to valve 34.

Figure 5:
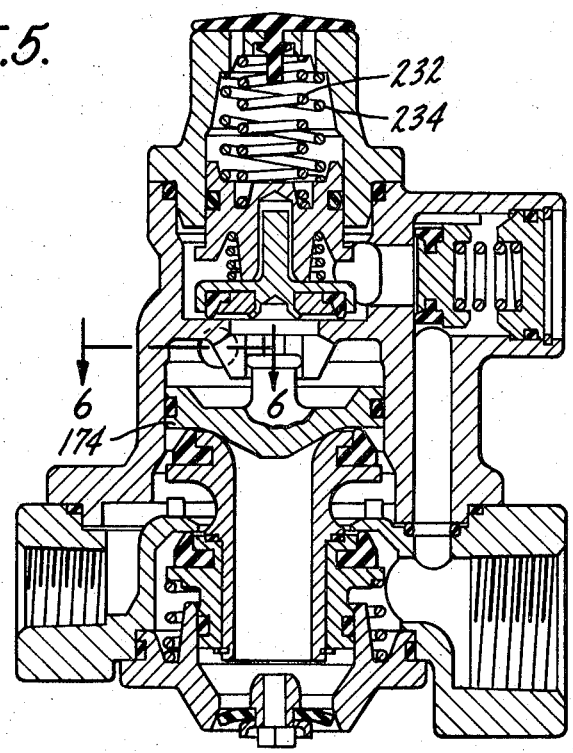
FIG. 5 is a vertical section, similar to FIG. 3, showing a modified form of valve structure.
Figure 6:
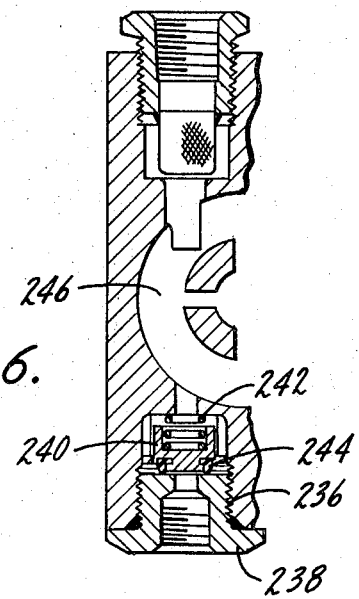
FIG. 6 is a section along plane 6—6 of FIG. 5.

Looking at the structure in FIGS. 5 and 6, the valve of FIG. 5 is essentially the same as the valve of FIG. 3 with certain minor modifications. Spring 196 has been replaced by a pair of nested coil springs 232 and 234. The position of inlet pressure port 170 has been slightly modified and there is no longer a relief passage 190 in piston 174. Generally, in other respects the valves are the same.

As shown particularly in FIG. 6, there is a service line inlet port 236 which will connect to the line 230 shown in FIG. 4. Positioned within port 236 is an adapter 238 which seats a valve member 240 biased toward a closing positon by a spring 242. A seal member 244 is carried by the valve member and, when the check valve described and shown is in the position of FIG. 6, there is no communication between line 230 and chamber 246 which is above piston 174. However, when there is air pressure trapped within the service line 16, and there is no pressure above piston 174, such trapped pressure will open the check valve of FIG. 6 by moving valve member 240 against spring 242 to permit the pressure in service line 16 to be exhausted through valve 34.

Whereas the preferred form of the invention has been shown and described herein, it should be realized that there may be many modifications, substitutions and alterations thereto.

The embodiments of the invention in which an exclusive property or privilege is claimed are defined as follows:

1. A valve for use in applying brake releasing pressure to spring-actuated brakes in a vehicle air brake system having a service tank and an emergency tank, said valve including a housing having an emergency tank port, a service tank port, at least one brake chamber port, an exhaust port and an air pressure inlet, first passage means in said housing between said emergency tank port and said brake chamber port, a spring-biased shuttle positioned in said first passage means for closing the same, piston means in said housing responsive to air pressure at said inlet for moving said shuttle to open said first passage means, second passage means in said housing for connecting said inlet and said service tank port, valve means spring-biased toward a closing position in said second passage means, air pressure above a predetermined level at said inlet causing said second passage valve means to open connecting said inlet and service tank ports, third passage means in said housing for connecting said inlet and said emergency tank port, and valve means spring-biased toward a closing position in said third passage means.

2. The structure of claim 1 further characterized by and including a diaphragm valve member associated with said exhaust port and said brake chamber port.

3. The structure of claim 2 further characterized in that said diaphragm is positioned within said first passage means, the application of air pressure from said emergency tank port causing said diaphragm to close said exhaust port.

4. The structure of claim 1 further characterized in that the valve means in said third passage means includes a piston, a seal member carried by said piston and a spring normally urging said piston and seal member to a position to close said third passage means.

5. The structure of claim 1 further characterized in that said second passage valve means includes a first piston and a second piston, spring means urging said first piston away from said second piston and urging said first piston to a closing position in said second passage means.

6. The structure of claim 5 further characterized in that said first piston is carried by said second piston and is movable relative thereto, said first piston carrying a seal member for closing said second passage means.

7. The structure of claim 5 further characterized by and including a spring urging said first and second pistons toward a closing position.

8. The structure of claim 1 further characterized by and including spring means normally biasing said piston away from said shuttle.

9. The structure of claim 8 further characterized by and including a check valve carried by said piston for connecting said first passage means to said inlet.

10. The structure of claim 9 further characterized by and including a passage connecting said inlet port and said first passage means, said piston being movable in said last-named passage.

11. The structure of claim 1 further characterized in that the piston means in said first passage means has pressure responsive areas on opposite sides thereof.

12. The structure of claim 11 further characterized in that one side of said piston means in said first passage means is in communication with said inlet, with the opposite side being in communication with said brake chamber port.

13. The structure of claim 12 further characterized in that said opposite side of said piston means has an air pressure responsive area bearing a predetermined relationship to the air pressure responsive area of said piston means in communication with said inlet.

14. The structure of claim 13 further characterized in that the air pressure area of said piston means in communication with said inlet is on the order of about twice the air pressure area of said piston means in communication with said brake chamber port.

15. The structure of claim 1 further characterized in that said piston means in said first passage means and spring-biased shuttle are concentrically positioned within said housing.

16. The structure of claim 15 further characterized in that said shuttle carries a seal member in contact with one side of said piston means, with the area of said first piston means side outside of said seal member forming an air pressure responsive area.

17. The structure of claim 16 further characterized in that the opposite side of said first piston means forms a second air pressure responsive area.

18. The structure of claim 1 further characterized by and including a service line port in said housing in communication with said air pressure inlet, and check valve means positioned to normally close said service line port.

19. The structure of claim 18 further characterized in that said check valve means includes a valve member and a spring normally biasing said valve member to a closed position in relation to said service line port.

20. The structure of claim 1 further characterized in that said third passage means is between said service tank port and said emergency tank port, opening of the valve means in said second passage means to connect the inlet and service tank ports causing inlet air pressure to open the third passage valve means to connect the emergency tank port with the inlet.

* * * * *